United States Patent
Walton et al.

(10) Patent No.: US 8,036,710 B2
(45) Date of Patent: Oct. 11, 2011

(54) POWER-EFFICIENT MULTI-ANTENNA WIRELESS DEVICE

(75) Inventors: Jay Rodney Walton, Carlisle, MA (US); Franklin Peter Antonio, Del Mar, CA (US); Mark S. Wallace, Bedford, MA (US); Sriram Narayan, Westford, MA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 11/047,917

(22) Filed: Jan. 31, 2005

(65) Prior Publication Data
US 2005/0250452 A1 Nov. 10, 2005

Related U.S. Application Data

(60) Provisional application No. 60/569,018, filed on May 7, 2004.

(51) Int. Cl.
*H04M 1/00* (2006.01)
*H04B 1/38* (2006.01)

(52) U.S. Cl. ..................... 455/562.1; 455/574

(58) Field of Classification Search ............... 455/575.7, 455/101, 574, 343.1, 550.1, 553.1, 573, 562.1
See application file for complete search history.

(56) References Cited

U.S. PATENT DOCUMENTS

| | | | |
|---|---|---|---|
| 6,434,187 B1 * | 8/2002 | Beard et al. | 375/219 |
| 6,456,856 B1 * | 9/2002 | Werling et al. | 455/575.5 |
| 6,594,475 B1 * | 7/2003 | Anvekar et al. | 455/277.1 |
| 6,600,907 B1 * | 7/2003 | Taguchi | 455/132 |
| 6,678,508 B1 * | 1/2004 | Koilpillai et al. | 455/137 |
| 6,965,788 B1 * | 11/2005 | Barratt et al. | 455/574 |
| 7,024,168 B1 * | 4/2006 | Gustafsson et al. | 455/135 |
| 2003/0013476 A1 * | 1/2003 | Park et al. | 455/522 |
| 2003/0235147 A1 * | 12/2003 | Walton et al. | 370/204 |

(Continued)

FOREIGN PATENT DOCUMENTS
EP 0 665 658 A2 1/1995
(Continued)

OTHER PUBLICATIONS

CN OA dated Jan. 9, 2009 for CN Application Serial No. 200580022668.5, 35 pages.

(Continued)

*Primary Examiner* — George Eng
*Assistant Examiner* — Michael Faragalla
(74) *Attorney, Agent, or Firm* — QUALCOMM Patent Group; Thien T. Nguyen; James H. Yancey, Jr.

(57) ABSTRACT

A power-efficient wireless device is equipped with multiple (N) antennas. Each antenna is associated with a transmitter unit and a receiver unit. The wireless device also has processing units used to perform various digital processing tasks. The transmitter units, receiver units, and processing units may be selectively enabled or disabled. In an idle state, the wireless device may enable only a subset (e.g., one) of the N receiver units and one or few processing units for signal detection and acquisition. For active communication, the wireless device may enable $N_{tx}$ transmitter units for data transmission and/or $N_{rx}$ receiver units for data reception, where $1 \leq N_{tx} \leq N$ and $1 \leq N_{rx} \leq N$. The enabled processing units may also be clocked at a lower frequency whenever data is transmitted or received at a data rate lower than the highest data rate. The wireless device may go to sleep whenever possible to conserve power.

10 Claims, 4 Drawing Sheets

U.S. PATENT DOCUMENTS

| | | | |
|---|---|---|---|
| 2004/0135642 A1* | 7/2004 | Ishii | 331/16 |
| 2004/0219959 A1* | 11/2004 | Khayrallah et al. | 455/575.7 |
| 2005/0085197 A1* | 4/2005 | Laroia et al. | 455/101 |
| 2005/0277387 A1* | 12/2005 | Kojima et al. | 455/78 |

FOREIGN PATENT DOCUMENTS

| | | | |
|---|---|---|---|
| EP | 1 387 501 A1 | | 8/2002 |
| EP | 1387501 A1 | * | 2/2004 |
| JP | 64-073832 | | 3/1989 |
| JP | 04-120920 | | 4/1992 |
| JP | 2003087185 | | 3/2003 |
| JP | 2003-258707 | | 9/2003 |
| WO | WO 01/59945 A1 | | 8/2001 |
| WO | 03030403 A1 | | 4/2003 |
| WO | WO 03/030403 | | 4/2003 |

OTHER PUBLICATIONS

JP Office Action dated Jul. 7, 2009 for JP application serial No. 2007-511446.

International Search Report and Written Opinion~PCT/US2005/014851, International Search Authority~European Patent Office~Jul. 27, 2005.

* cited by examiner

POWER-EFFICIENT MULTI-ANTENNA WIRELESS DEVICE

CLAIM OF PRIORITY UNDER 35 U.S.C. §119

The present Application for Patent claims priority to Provisional Application Ser. No. 60/569,018, entitled "Power-Efficient Multi-Antenna Wireless Device," filed May 7, 2004, and assigned to the assignee hereof and hereby expressly incorporated by reference herein.

BACKGROUND

I. Field

The present invention relates generally to an electronics device, and more specifically to a multi-antenna wireless device.

II. Background

A multiple-input multiple-output (MIMO) communication system employs multiple ($N_T$) transmit antennas and multiple ($N_R$) receive antennas for data transmission. A MIMO channel formed by the $N_T$ transmit antennas and $N_R$ receive antennas may be decomposed into $N_S$ spatial channels, where $N_S \leq \min \{N_T, N_R\}$. The $N_S$ spatial channels may be used to transmit data in parallel to achieve higher throughput and/or redundantly to achieve greater reliability.

A multi-antenna wireless device is equipped with multiple antennas that may be used for data transmission and/or reception. Each antenna may be associated with (1) transmit circuitry used to process a baseband output signal to generate a radio frequency (RF) output signal suitable for transmission via a wireless channel and (2) receive circuitry used to process an RF input signal to obtain a baseband input signal. The multi-antenna wireless device also typically has digital circuitry used to digitally process data for transmission and reception.

Due to the additional complexity associated with MIMO operation, the multi-antenna wireless device may be much more complex than a single-antenna wireless device in a system that can support both single-antenna and multi-antenna wireless devices. The multi-antenna wireless device may thus consume much more power than the single-antenna wireless device. The higher power consumption is undesirable, especially if the multi-antenna wireless device is a portable unit (e.g., a handset) that is powered by an internal battery. The higher power consumption depletes the available battery resources more quickly, which then shortens both the standby time between battery recharges and the on time for active communication.

There is therefore a need in the art for a multi-antenna wireless device that is power efficient.

SUMMARY

A power-efficient multi-antenna wireless device employing various power saving techniques is described herein. The wireless device is equipped with multiple (N) antennas. In an embodiment, the multi-antenna wireless device comprises multiple transmitter units operatively coupled to the N antennas, one transmitter unit for each different set of at least one antenna among the N antennas. Each transmitter unit processes a respective input baseband signal and provide a radio frequency (RF) output signal. A controller selectively enables one or more transmitter units, as needed, for transmission. In another embodiment, the multi-antenna wireless device comprises multiple receiver units operatively coupled to the antennas, one receiver unit for each different set of at least one antenna among the N antennas. Each receiver unit processes a respective RF input signal and provide a baseband output signal. The controller selectively enables one or more receiver units, as needed, for reception. In yet another embodiment, the multi-antenna wireless device comprises at least one processing unit (e.g., a data processor, a spatial processor, a modulator, a demodulator, a detection/acquisition unit, and so on). Each processing unit performs designated processing for transmission or reception via at least one antenna. Each processing unit is enabled if the processing by that unit is used for transmission or reception and is disabled otherwise. The controller enables or disables each processing unit, as needed. The transmitter units, receiver units, and processing units may be selectively enabled or disabled, for example, by supplying or not supplying power to these circuit blocks, by enabling or disabling the clocks for the processing units, and so on.

Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
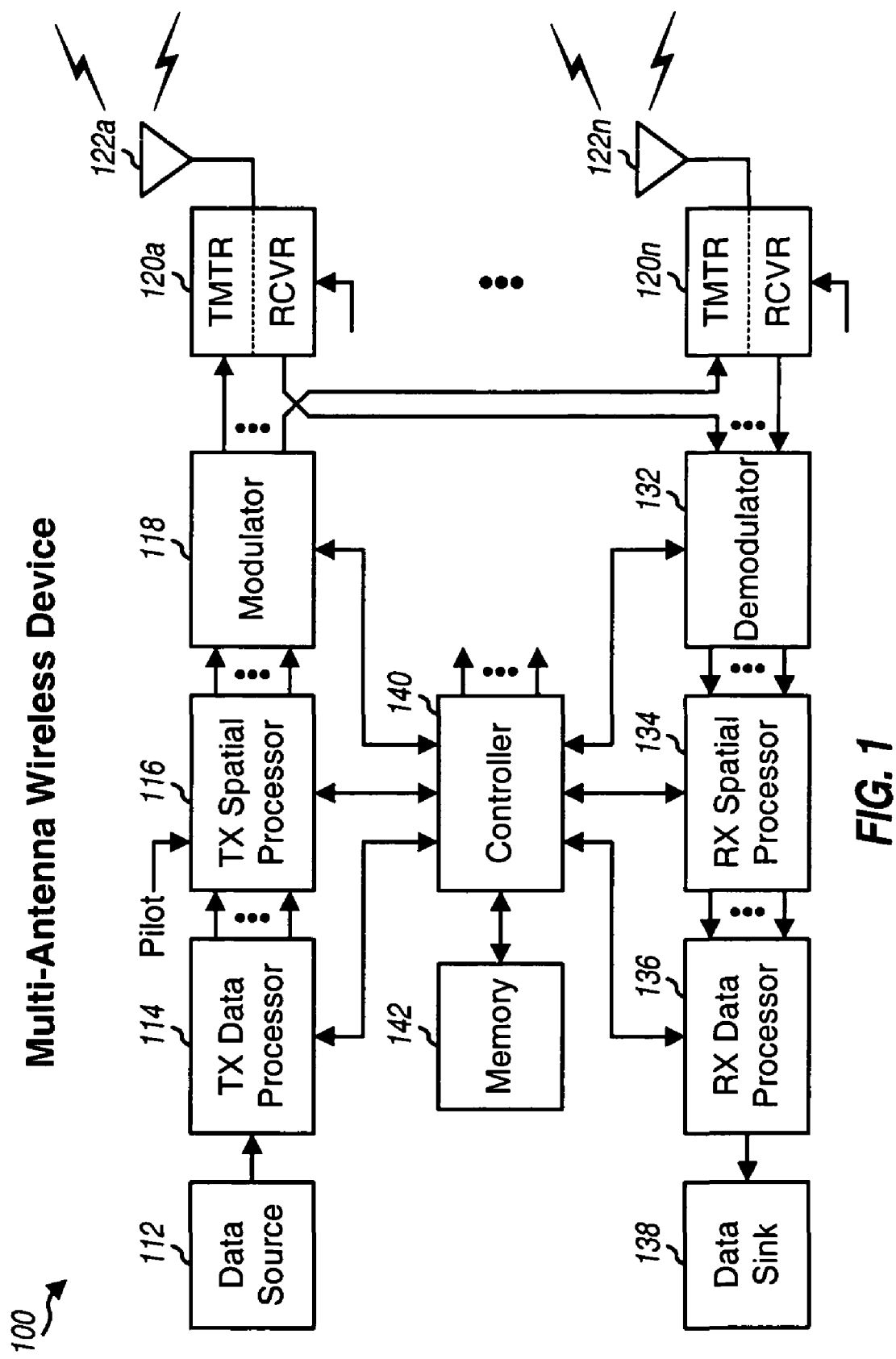
FIG. 1 shows a block diagram of a multi-antenna wireless device.

FIG. 1 shows a block diagram of a multi-antenna wireless device 100, which is equipped with multiple (N) antennas 122a through 122n. Each antenna 122 is associated with a transceiver unit 120 that includes a transmitter unit (TMTR) and a receiver unit (RCVR).

For data transmission, a transmit (TX) data processor 114 receives traffic data from a data source 112, processes (e.g., encodes, interleaves, and symbol maps) the traffic data and control data from a controller 140, and provides data symbols. As used herein, a "data symbol" is a modulation symbol for data, a "pilot symbol" is a modulation symbol for pilot (which is data that is known a priori by both a transmitting entity and a receiving entity), a "transmit symbol" is a symbol to be sent from an antenna, and a "received symbol" is a symbol obtained from an antenna. A TX spatial processor 116 performs spatial processing on the data symbols and pilot symbols, if and as appropriate. TX spatial processor 116 provides $N_{tx}$ streams of transmit symbols, one transmit symbol stream for each antenna to be used for data transmission, where $1 \leq N_{tx} \leq N$. A modulator 118 performs modulation on the $N_{tx}$ transmit symbol streams and provides $N_{tx}$ streams of chips, one chip stream for each transmit symbol stream. Each chip is a complex-value to be transmitted from one antenna in one chip period. The modulation performed by modulator 118 is dependent on the modulation technique used by the system. For example, modulator 118 performs orthogonal frequency division multiplexing (OFDM) modulation if the system utilizes OFDM and performs code division multiplexing (CDM) if the system utilizes CDM. In any case, $N_{tx}$ transmitter units selected from among the N transmitter units in transceiver units 120a through 120n receive the $N_{tx}$ chip streams. Each selected transmitter unit conditions its chip stream and generates a corresponding RF output signal. The $N_{tx}$ selected transmitter units provide $N_{tx}$ RF output signals to $N_{tx}$ antennas associated with these transmitter units. The $N_{tx}$ RF output signals are transmitted from these $N_{tx}$ antennas.

For data reception, $N_{rx}$ antennas selected from among the N antennas 122a through 122n receive RF modulated signals transmitted by other entity(ies), where $1 \leq N_{rx} \leq N$. Each selected antenna provides a received signal to the receiver unit in the associated transceiver unit. Each receiver unit performs processing complementary to that performed by the transmitter units at the transmitting entity(ies) and provides a stream of samples. A demodulator 132 receives $N_{rx}$ sample streams from the $N_{rx}$ receiver units for the $N_{rx}$ selected antennas, performs demodulation on these $N_{rx}$ sample streams, and provides $N_{rx}$ streams of received symbols. A receive (RX) spatial processor 134 performs receiver spatial processing (or spatial matched filtering) on the $N_{rx}$ received symbol streams, if and as appropriate, and provides $N_{rx}$ streams of detected data symbols, which are estimates of the data symbols sent by the transmitting entity(ies). An RX data processor 136 processes (e.g., symbol demaps, deinterleaves, and decodes) the detected data symbols and provides decoded data to a data sink 138.

Controller 140 controls the operation of various processing units at wireless device 100. Memory unit 142 stores data and program codes used by controller 140 and other processing units at wireless device 100.

FIG. 1 shows a functional block diagram with various processing units for an exemplary multi-antenna wireless device 100. In general, a multi-antenna wireless device may include any type and any number of processing units. For example, a wireless device may include processing units for various functions and applications such as video, audio, game, input/output (I/O) interface with external units attached to the wireless device, and so on. The processing units for the multi-antenna wireless device may also be implemented in various manners.

Figure 2:
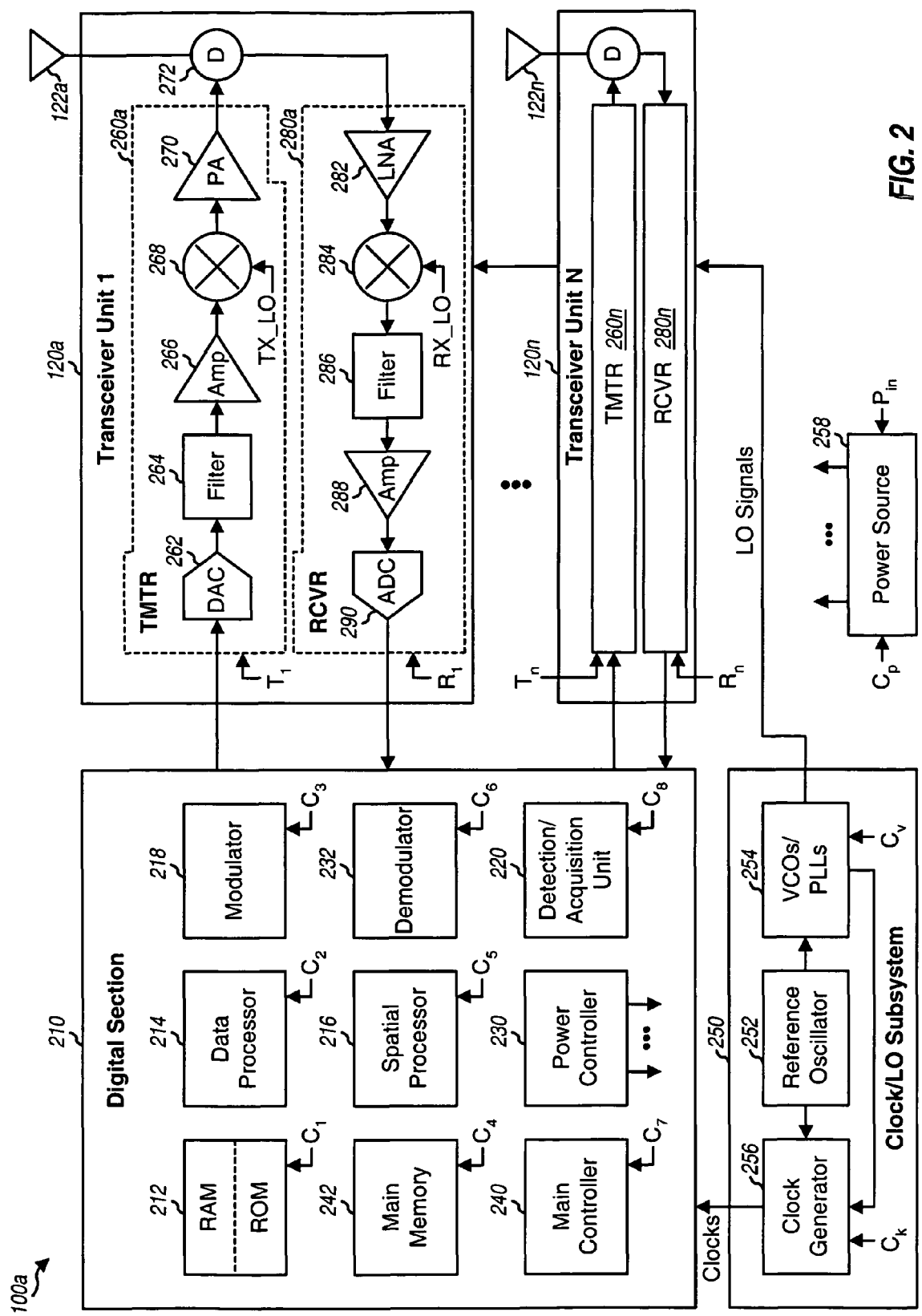
FIG. 2 shows an embodiment of the multi-antenna wireless device in FIG. 1.

FIG. 2 shows a multi-antenna wireless device 100a, which is one embodiment of wireless device 100 in FIG. 1. For this embodiment, wireless device 100a includes a digital section 210, a clock/local oscillator (LO) subsystem 250, and N transceiver units 120a through 120n coupled to the N antennas 122a through 122n, respectively.

Digital section 210 includes various processing units that perform digital processing for data transmission and reception. A processing unit is a circuit block that performs some type of digital processing. This is in contrast to a circuit block that performs no processing (e.g., a memory unit) or a circuit block that performs analog processing (e.g., a transmitter or receiver unit). Within digital section 210, a data processor 214 implements TX data processor 114 and RX data processor 136 in FIG. 1, and a spatial processor 216 implements TX spatial processor 116 and RX spatial processor 134 in FIG. 1. A modulator 218 and a demodulator 232 implement modulator 118 and demodulator 132, respectively. A random access memory (RAM) and a read only memory (ROM) 212 store data and program codes used by various processing units within digital section 210. A detection/acquisition unit 220 performs processing to detect and acquire signals from other transmitting entities. A main controller 240 controls the operation of various processing units within wireless device 100a. A power controller 230 performs power management for wireless device 100a. Controllers 230 and 240 may implement controller 140 in FIG. 1. A main memory 242 provides bulk/mass storage for data and codes used by various processing units within wireless device 100a and may implement data source 112, data sink 138, and memory 142 in FIG. 1. The circuit blocks within digital section 210 may be implemented with power-efficient circuit structures such as latches.

Clock/LO subsystem 250 generates clocks for the processing units within digital section 210 and LO signals for transceiver units 120a through 120n. Within subsystem 250, a reference oscillator 252 generates a reference clock signal and may be implemented with a temperate compensated crystal oscillator (TCXO) or some other oscillator design. Voltage controlled oscillators (VCOs) and phase locked loops (PLLs) within a unit 254 receive the reference clock signal and generate an LO signal (TX_LO) for the transmitter units and an LO signal (RX_LO) for the receiver units. A clock generator 256 receives a high frequency clock signal from unit 254 and/or the reference clock signal from oscillator 252 and generates the clocks for the processing units within digital section 210. Clock generator 256 may include one or more frequency dividers. Each divider receives and divides the high frequency or reference clock signal and provides an output clock. Each processing unit in section 210 may operate based on a set of one or more clocks from clock generator 256. The various processing units in section 210 may operate based on the same or different sets of clocks.

Each transceiver unit 120 includes a transmitter unit 260 and a receiver unit 280. The transmitter and receiver units may be implemented with a super-heterodyne architecture or a direct-conversion architecture. For the super-heterodyne architecture, frequency conversion between RF and baseband is performed in multiple stages, e.g., from RF to an intermediate frequency (IF) in one stage, and then from IF to baseband in another stage. For the direct-conversion architecture, frequency conversion is performed in a single stage, e.g., from RF directly to baseband. For simplicity, FIG. 2 shows an embodiment of transmitter unit 260 and receiver unit 280 using the direct-conversion architecture.

Within transmitter unit 260, a digital-to-analog converter (DAC) 262 receives a stream of digital chips from digital section 210, converts the chips to analog, and provides an analog baseband output signal. A filter 264 then filters the baseband output signal to remove undesired images generated by the digital-to-analog conversion and provides a filtered baseband signal. An amplifier (Amp) 266 amplifies and buffers the filtered baseband signal and provides an amplified baseband signal. A mixer 268 modulates the TX_LO signal from unit 254 with the amplified baseband signal and provides an upconverted signal. A power amplifier (PA) 270 amplifies the upconverted signal and provides an RF output signal, which is routed through a duplexer (D) 272 and provided to antenna 122.

Within receiver unit 280, a low noise amplifier (LNA) 282 receives an RF input signal from antenna 122 and via duplexer 272. LNA 282 amplifies the RF input signal and provides a conditioned signal having the desired signal level. A mixer 284 demodulates the conditioned signal with the RX_LO signal from unit 254 and provides a downconverted signal. A filter 286 filters the downconverted signal to pass the desired signal components and remove noise and undesired signals that may be generated by the downconversion process. An amplifier 288 amplifies and buffers the filtered signal and provides a baseband input signal. An analog-to-digital converter (ADC) 290 converts the baseband input signal to digital and provides a stream of samples to digital section 210.

FIG. 2 shows exemplary designs for the transmitter and receiver units. For these designs, the DAC and ADC are shown as being parts of the transmitter unit and receiver unit, respectively. In general, the transmitter and receiver units may each include one or more stages of amplifier, filter, mixer, and so on, which may be arranged differently from that shown in FIG. 2. The transmitter and receiver units may or may not include the DAC and ADC, respectively. The amplifiers may have fixed or variable gains. The transmitter units and the receiver units may be implemented such that each transceiver unit includes a transmitter unit and a receiver unit, as shown in FIGS. 1 and 2. The transmitter units may also be implemented as one unit or module, and the receiver units may also be implemented as another unit or module. Each transmitter unit may also be associated with a set of one or more antennas, and each receiver unit may also be associated with a set of one or more antennas.

A power source 258 provides power to various circuit blocks within wireless device 100a. Power source 258 may include a rechargeable battery and/or may receive power from an external source via a power input, $P_{in}$. Power source 258 may also include switches that receive a control signal labeled as $C_p$ and selectively provide power to each of the circuit blocks receiving power from the power source.

Alternatively, each circuit block may include one or more switches that receive a control signal for that circuit block and power on or off the circuit block. In general, a control signal may include one or multiple signal lines.

Wireless device 100a may be designed to consume less power while providing the required functionality. This may be achieved by designing the various circuit blocks within wireless device 100a such that they may be individually enabled and disabled.

An analog circuit block may be enabled or disabled by supplying power or not supplying power to the circuit block, e.g., via one or more switches. A digital circuit block may be enabled or disabled by (1) supplying power or not supplying power to the circuit block via one or more switches and/or (2) enabling or disabling the clocks' to the digital circuit block. A digital circuit block may be powered on or off (e.g., via a head-switch and/or a foot-switch) to avoid leakage current, which may be large as integrated circuit (IC) fabrication technology continues to improve and the size of transistors continues to shrink.

For the embodiment shown in FIG. 2, each receiver unit i may be selectively enabled or disabled based on a respective control signal $R_i$, where i=1 ... N. Similarly, each transmitter unit j may be selectively enabled or disabled based on a respective control signal $T_j$, where j=1 ... N. Wireless device 110a may enable any number of receiver units by properly setting the N control signals for the N receiver units and may also enable any number of transmitter units by properly setting the N control signals for the N transmitter units.

The various circuit blocks within digital section 210 may also be designed such that each circuit block (or possibly different sections of each circuit block) may be selectively enabled or disabled. For the embodiment shown in FIG. 2, memory unit 212, data processor 214, modulator 218, main memory 242, spatial processor 216, demodulator 232, main controller 240, and detection/acquisition unit 220 are controlled by eight control signals labeled as $C_1$ through $C_8$, respectively. Each control signal may selectively enable or disable all or a portion of the associated circuit block. Wireless device 100a may also be designed with different circuit blocks for the digital section and/or such that different circuit blocks may be selectively enabled and disabled.

The circuit blocks within clock/LO subsystem 250 may also be selectively controlled for power saving. The VCOs and PLLs in unit 254 may be selectively enabled or disabled based on a control signal labeled as CV. One set of VCO and PLL may be used to generate the TX_LO signal for all N transmitter units, and another set of VCO and PLL may be used to generate the RX_LO signal for all N receiver units. If only the receiver units are being used, then the VCO and PLL for the transmitter units may be disabled to conserve power. Conversely, if only the transmitter units are being used, then the VCO and PLL for the receiver units may be disabled. Clock generator 256 may be controlled based on a control signal labeled as $C_k$. Clock generator 256 may generate and provide a set of one or more clocks to each processing unit within digital section 210. Clock generator 256 may be controlled to (1) disable certain sets of clocks to certain processing units, (2) generate clocks with different (e.g., lower) frequencies for all or certain processing units, and so on. For a digital circuit that is fabricated with complementary metal oxide semiconductor (CMOS), power consumption is proportional to the frequency of the clock used for the digital circuit. Lower power consumption may be attained for the processing units within digital section 210 by reducing the clock frequency for these processing units whenever possible.

For clarity, FIG. 2 shows a separate control signal being provided to each controllable circuit block. A serial bus may also be used to control multiple circuit blocks. For example, each transmitter unit and each receiver unit may be assigned a unique address and may be individually enabled or disabled by the serial bus based on its address.

Power controller 230 generates the control signals for the various circuit blocks within wireless device 100a. Power controller 230 obtains information indicating the operating state of wireless device 100a (e.g., via user input or main controller 240) and generates the control signals accordingly. Power controller 230 may include timers, state machines, look-up tables, and so on, which may be used to generate the proper control signals for the various circuit blocks.

With wireless device 100a designed using modular controllable circuit blocks as described above, reduced power consumption may be achieved by selectively enabling as few circuit blocks as possible to perform the required tasks and disabling as many circuit blocks as possible to conserve power. The selective enabling/disabling of the circuit blocks may be performed as described below.

Wireless device 100a may support a number of operating modes. Table 1 lists some of the supported operating modes and their short descriptions.

TABLE 1

| Operating Mode | Description |
| --- | --- |
| Single-input (SI) | Reception of one RF input signal from one antenna. |
| Multiple-input (MI) | Reception of multiple RF input signals from multiple antennas. |
| Single-output (SO) | Transmission of one RF output signal from one antenna. |
| Multiple-output (MO) | Transmission of multiple RF output signals from multiple antennas. |

The SI and MI modes are receive-only modes, and the SO and MO modes are transmit-only modes. Additional operating modes may be formed with different combinations of the four operating modes shown in Table 1. For example, a SISO mode supports transmission of one RF output signal and reception of one RF input signal, a MISO mode supports transmission of one RF output signal and reception of multiple RF input signals, a SIMO mode supports transmission of multiple RF output signals and reception of one RF input signal, and a MIMO mode supports transmission of multiple RF output signals and reception of multiple RF input signals. The SISO, SIMO, MISO, and MIMO modes are transmit-receive modes that support both data transmission and reception. The same or different antennas may be used for data transmission and reception when fewer than N antennas are selected for use. A "standby" mode may also be defined whereby data is neither being transmitted nor received.

For each operating mode, wireless device 100a may enable only the transmitter units and only the receiver units that are required for that operating mode. For example, all transmitter units may be disabled for the receive-only modes, all receiver units may be disabled for the transmit-only modes, and all transmitter and receiver units may be disabled for the standby mode. Wireless device 100a may also disable the unused transmitter units and receiver units when fewer than N units are selected for use.

Wireless device 100a may also disable certain processing units within digital section 210 for some operating modes. For example, modulator 218 may be disabled for the receive-only modes, demodulator 232 may be disabled for the transmit-only modes, and spatial processor 216 may be disabled for the SI and SO modes. A transmit portion of data processor 214 (e.g., for encoding, interleaving, and symbol mapping) maybe disabled for the receive-only modes, and a receive portion of data processor 214 (e.g., for decoding, deinterleaving, and symbol demapping) may be disabled for the transmit-only modes.

Wireless device 100a may also adjust the frequency of the clocks for the processing units within digital section 210 based on the data rates for data transmission and reception. The system may support a range of data rates, and the difference between the lowest data rate, $R_{min}$, and the highest data rate, $R_{max}$, may be large. Wireless device 100a may be designed with the capability to transmit and receive data at the highest data rate. This is typically achieved by designing the processing units with sufficient processing capabilities and operating the processing units at a specified maximum clock frequency, $f_{max}$. However, data is typically not sent and received at the highest data rate all of the time. When a data rate lower than $R_{max}$ is used, it may be possible to operate the processing units at a clock frequency that is lower than $f_{max}$ to reduce power consumption while still completing all of the required processing tasks in a timely manner. The clock frequency for the processing units may be a function of data rate, so that different clock frequencies may be used for different data rates. Power controller 230 may determine the lowest possible clock frequency that may be used for the current data rate and provide the appropriate control signal to clock generator 256. Clock generator 256 may then adjust its divider circuitry based on the control signal to generate clocks at the desired frequency.

The same or different data rates may be used for data transmission and reception. The same or different clock frequencies may be used for the processing units used for data transmission and reception, depending on the transmit and receive data rates. Modulator 218 and demodulator 232 may operate at the same or different clock frequencies. The transmit and receive portions of data processor 214 may also operate at the same or different clock frequencies. Spatial processor 216 may contain processing engines (e.g., multipliers) that may be used for both data transmission and reception. The clock frequency for these engines may be appropriately selected based on the transmit and receive data rates.

Wireless device 100a may also be designed to operate in a number of states. Each state may be associated with different processing capabilities and different tasks.

Figure 3B:
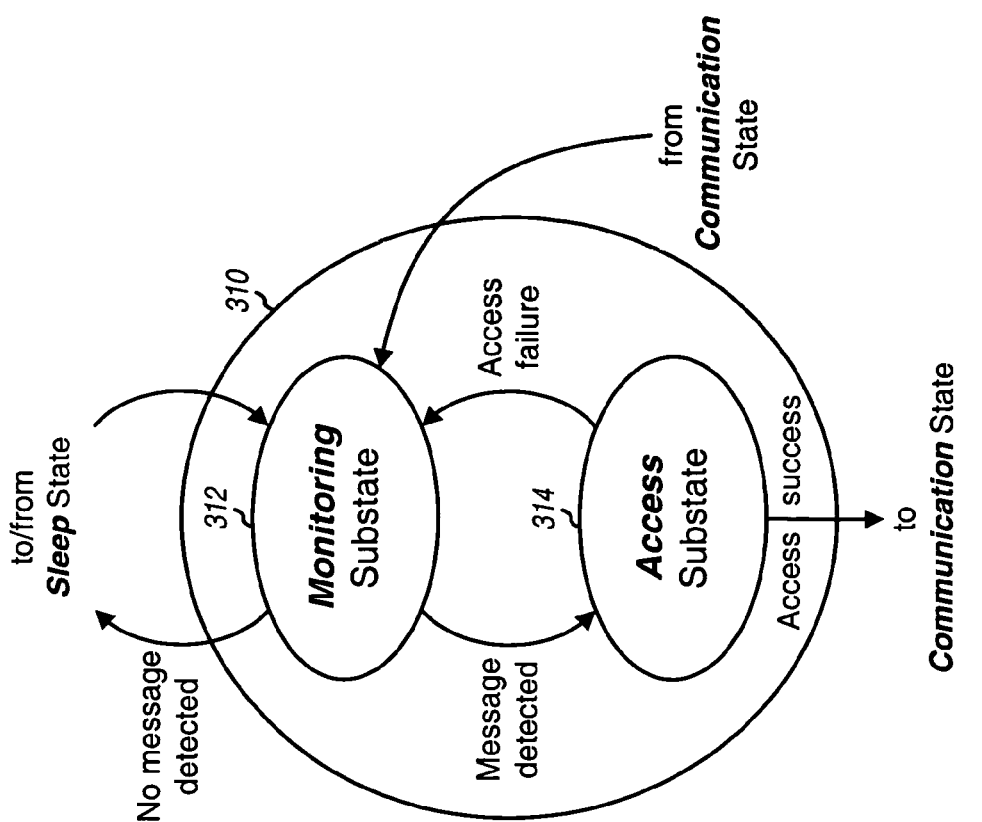
FIGS. 3A and 3B show exemplary state diagrams for the wireless device.
Figure 3A:
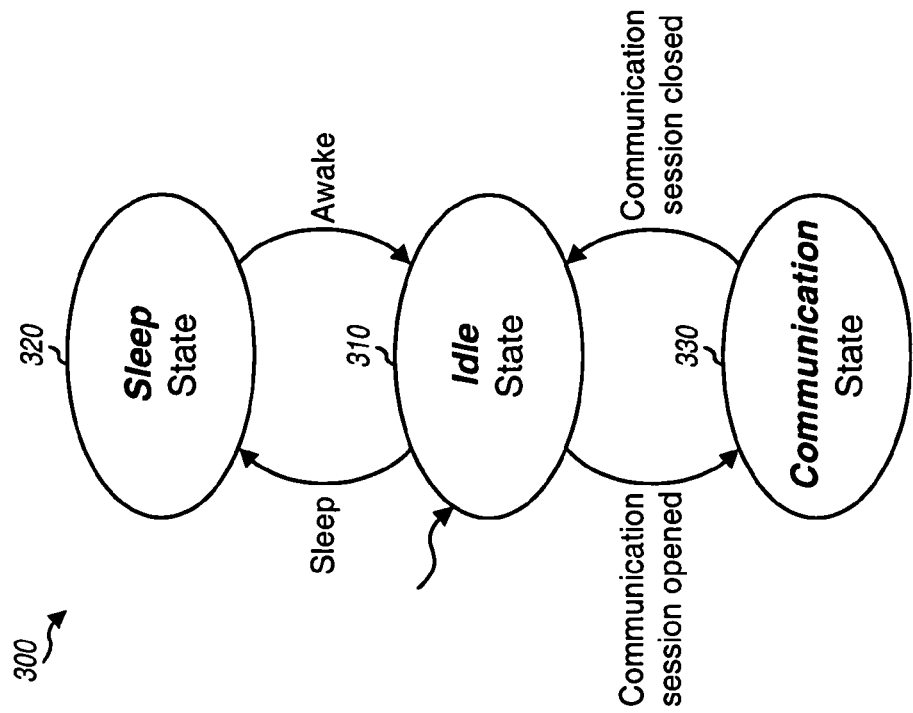

FIG. 3A shows an exemplary state diagram 300 for wireless device 100a. This state diagram includes three states—an Idle state 310, a Sleep state 320, and a Communication state 330. Each of the three states may include a number of sub-states.

FIG. 3B shows an exemplary state diagram for Idle state 310, which includes two substates—a Monitoring substate 312 and an Access substate 314.

In the Monitoring substate, wireless device 100a detects for the presence of signals from other entities. The detection may be performed based on a pilot transmitted by each entity. If any signal is detected, then wireless device 100a attempts to acquire the frequency and timing of the signal and to recover overhead information and signaling messages from the signal. If the signal is acquired and the signaling messages indicate that a data transmission requested, then wireless device 100a transitions to the Access substate. Wireless device 100a does not transition to the Access substate if (1) no signal is detected or (2) a signal is detected but either acquisition fails or the signaling messages do not indicate that a data transmission is requested. Wireless device 100a may remain in the Monitoring substate and continually perform detection and acquisition. Alternatively, wireless device 100a may perform detection and acquisition periodically or sporadically in certain time windows, which are called awake periods. Wireless device 100a may transition from the Monitoring substate to the Sleep state in the time between the awake periods to conserve power, as described below.

In the Access substate, wireless device 100a attempts to establish a communication session with another entity, which is called a "target" entity. Wireless device 100a attempts to access the system if the target entity is an access point in the system and attempts to establish peer-to-peer communication if the target entity is another wireless device. Wireless device 100a may exchange short messages with the target entity to configure both entities for data transmission and/or reception, request resources, and so on. Wireless device 100a transitions to the Communication state if access is successful and a communication session is opened. Wireless device 100a returns to the Monitoring substate if access fails.

The wireless device may spend a large percentage of time in the Idle state. In the Idle state, the wireless device may enable only a subset (e.g., one) of the N receiver units and only the processing unit(s) used for signal detection and acquisition. The wireless device may disable all other receiver units, all N transmitter units, and all processing units that are not needed for signal detection and acquisition.

In the Communication state, wireless device 100a may transmit data to and/or receive data from the target entity. Wireless device 100a or the target entity may terminate the communication session, at which time wireless device 100a returns to the Monitoring substate within the Idle state.

In the Sleep state, wireless device 100a may shut down as many circuit blocks as possible to conserve power. Wireless device 100a does not transmit or receive data while in the Sleep state. Wireless device 100a may maintain a timer to determine when to wake up from the Sleep state and may monitor for certain interrupts (e.g., user input) that can trigger an immediate transition to the Idle state.

Wireless device 100a may operate in any one of a number of "detection" modes that do not require continuous detection/acquisition. For example, if the system transmits pilots, overhead information, and signaling messages at known times, then wireless device 100a may operate in a "slotted" mode whereby it performs detection and acquisition only during these known times and goes to sleep during the remaining times, as described below. Wireless device 100a may also operate in a "power-save" mode whereby it goes to sleep indefinitely to conserve power and wakes up only if the user initiates a data transmission or some other event triggers a transition out of sleep.

FIGS. 3A and 3B show exemplary state diagrams for wireless device 100a. In general, a multi-antenna wireless device may operate in any number of states, and each state may include any number of substates.

Wireless device 100a may enable different circuit blocks in different states.

Some possible operating scenarios for the three states in FIG. 3A are described below.

In the Idle state, wireless device 100a may enable just a subset of the N receiver units and may disable all remaining receiver units as well as all N transmitter units. A transmitting entity typically transmits data in the most robust manner and at the lowest data rate when transmitting to an unknown receiving entity. Receive diversity and detection performance typically improve if the receiving entity uses more antennas to receive the transmission from the transmitting entity. However, it is normally not necessary to use all N antennas to detect for the presence of a signal or to acquire the signal. Power may be conserved by enabling only a limited number (e.g., one) of the receiver units and disabling the remaining receiver units.

In the Idle state, wireless device 100a may enable the desired number of receiver units via the control signals $R_i$ for these receiver units. For example, wireless device 100a may operate in the SI mode for the Idle state and enable only one receiver unit. Wireless device 100a may also use different capabilities for different processing tasks. For example, wireless device 100a may use one receiver unit for detection and acquisition of pilots from other entities and may use multiple receiver units to receive overhead information and signaling messages if pilots are detected.

In the Idle state, many of the circuit blocks in digital sections 210 that are used to process data for transmission and reception may also be disabled to conserve power.

For example, data processor 214, spatial processor 216, modulator 218, and demodulator 232 may be disabled in the Idle state. Detection/acquisition unit 220 may perform the necessary processing tasks to detect for signals and to acquire detected signals. Unit 220 may include circuitry to search for pilots, measure received pilot power, recover overhead information and signaling messages, and so on.

All or a portion of demodulator 232 and all or a portion of data processor 214 may be enabled in the Idle state, if and as necessary. If the system utilizes OFDM, then demodulator 232 may include one or more fast Fourier transform (FFT) engines used for OFDM demodulation. A portion of demodulator 232 may be enabled to perform OFDM demodulation for all of the receiver unit(s) enabled in the Idle state. Data processor 214 may include encoders, decoders, and so on, which are used for data transmission and reception. A portion of data processor 214 (e.g., the decoder for overhead information and signaling messages) may be enabled, e.g., only if a signal has been detected and acquired.

Spatial processor 216 is used for spatial processing to transmit data via multiple antennas and for spatial processing to receive data via multiple antennas. If only a single receiver unit is selected for use in the Idle state, then spatial processor 216 may be disabled during the entire time in the Idle state. Even if a few receiver units are selected for use in the Idle state, the receiver spatial processing for these receiver units may be relatively simple and may be performed by unit 220. Alternatively, spatial processor 216 may be enabled as necessary to perform receiver spatial processing for the few receiver units that are enabled in the Idle state.

In the Communication state, data may be transmitted continuously or intermittently, and data may also be received continuously or intermittently. At any given moment, wireless device 100a may operate in (1) a transmit-only mode if data is being transmitted but not received, (2) a receive-only mode if data is being received but not transmitted, (3) a transmit-receive mode if data is being transmitted and received, or (4) the standby mode if data is neither being transmitted nor received. Furthermore, wireless device 100a may use one, few, or all N transmitter units for data transmission and may use one, few, or all N receiver units for data reception. This depends on various factors such as, for example, the manner in which data is transmitted and received, the capability of the other entity with which wireless device 100a is in communication, and so on. For example, a transmission mode may use a specific number of (e.g., two) antennas to transmit data. As another example, the channel condition may be such that it is better to use fewer than N antennas for transmission and to distribute the total transmit power over fewer antennas so that more transmit power may be used for each enabled antenna (subject to the maximum output transmit power limit of the power amplifier and/or the antenna). Fewer than N antennas may also be used to receive a data transmission, e.g., if data is transmitted at a low data rate, if the other entity is equipped with one or a few antennas, and so on. In any case, wireless device 100a may enable only the transmitter units and only the receiver units, if any, that are required for the current operating mode and may disable all other transmitter and receiver units.

In general, for communication with another entity, the wireless device may utilize $N_{tx}$ of the N transmitter units for data transmission and/or $N_{rx}$ of the N receiver units for data reception, where $1 \leq N_{tx} \leq N$, $1 \leq N_{rx} \leq N$, and $N_{tx}$ may or may not be equal to $N_{rx}$. At any given moment, all N transmitter units and all N receiver units may not be required for communication for various reasons. In this case, the wireless device may disable transmitter and receiver units as well as processing units that are not used for communication.

Data may be transmitted and received at the highest data rates possible in order to conserve power and obtain other benefits. The highest transmit data rate may be achieved by using all N antennas for data transmission and using the maximum transmit power available for wireless device 100a. The highest receive data rate may be achieved by using all N antennas for data reception. For a given amount of data to be sent or received, a higher data rate allows for transmission or reception of the data in a shorter amount of time, which in turn allows the transmitter units and receiver units to be enabled for a shorter amount of time. Operating the processing units within digital section 210 at a higher clock frequency but for a shorter amount of time may reduce power consumption.

For both the Idle and Communication states, the processing units within digital section 210 may be clocked at a lower frequency whenever possible in order to reduce power consumption. In the Idle state, signaling messages may be sent at the lowest data rate, $R_{min}$, and wireless device 100a may use a low clock frequency to process and recover these messages. In the Communication state, data may be sent and received at variable data rates that may be determined based on various factors such as the channel condition, the available system resources at the transmitting and receiving entities, and so on. When data is transmitted and received at data rates lower than the highest data rate, $R_{max}$ the clock frequency for the processing units within digital section 210 may be reduced to reduce power consumption, as described above.

In the Sleep state, wireless device 100a may disable as many circuit blocks as possible in order to conserve power. For example, wireless device 100a may disable all N transmitter units, all N receiver units, all or most of the clock/LO subsystem, and most of the circuit blocks in digital section 210. Power controller 230 may provide the proper control signal to power source 258 and/or the circuit blocks to power down the various circuit blocks. Power controller 230 may also provide the proper control signal to clock generator 256, which disables the clocks to the disabled processing units within digital section 210. Power controller 230 may maintain a timer that counts down the amount of time spent in the Sleep state and informs the power controller when the timer expires. Power controller 230 may also include circuitry used to detect for interrupts (e.g., user inputs) that can trigger an immediate transition out of the Sleep state.

The system may include one or more access points that communicate with wireless devices under their coverage area. The system may also be designed such that the access points transmit pilots, overhead information, and signaling messages at designated times instead of continuously. Additional power saving may be realized for wireless devices operating in such a system.

Figure 4:
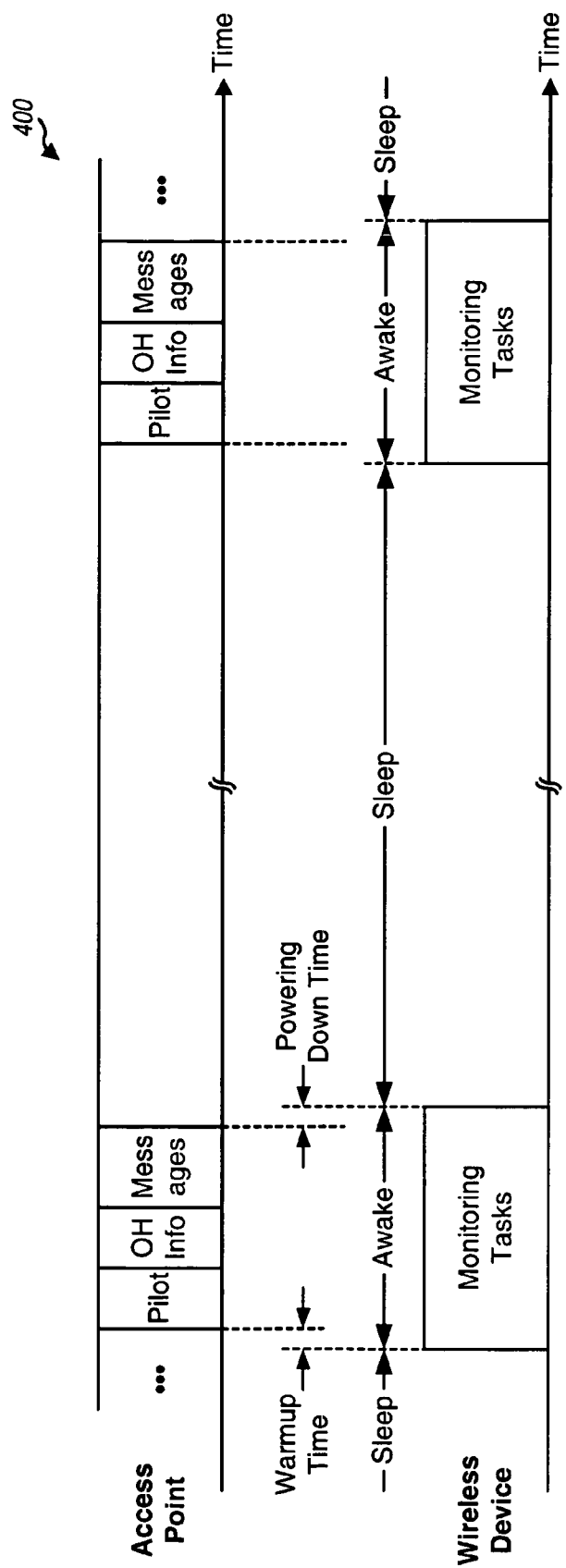
FIG. 4 shows a transmission format used by a wireless system.

FIG. 4 shows a timing diagram for an exemplary transmission format used by the system. For this transmission format, each access point transmits a pilot, overhead information (OH Info), and signaling messages periodically at designated times. For example, the pilot, overhead information, and signaling messages may be transmitted starting at fixed locations in each frame, which has a fixed time duration (e.g., 2 msec). The pilot may be used for signal detection, acquisition, channel estimation, and possibly other purposes. The overhead information may include various system parameters such as, e.g., the data rate used for the signaling messages, the duration of the messages, and so on. The signaling messages may be broadcast messages intended to be received by all wireless devices, multicast messages intended to be received by a specific group of wireless devices, and/or unicast messages intended to be received by a specific wireless devices.

Wireless device 100a may detect for pilots transmitted by the access points in the system and attempt to acquire the timing and frequency of each detected pilot. Wireless device 100a may then attempt to recover the overhead information for each access point that has been successfully acquired and to decode and recover signaling messages using the recovered overhead information.

If wireless device 100a is not in communication with any access point or another wireless device, then it may operate in the slotted mode and periodically detect for signals and messages from other entities. Wireless device 100a may wake up prior to the time that pilots are expected to be transmitted and perform monitoring tasks (e.g., detect and process pilots, process overhead information and signaling messages, and so on). Wireless device 100a may then go to sleep after all of the monitoring tasks are completed and no message requires wireless device 100a to remain awake. Wireless device 100a may sleep until the start of the next pilot transmission or some other time instant.

For simplicity, FIG. 4 shows one pilot transmission for each frame. The access point may transmit multiple pilots of different types in each frame, and each pilot may be used for different purposes. For example, a "beacon" pilot may be sent in a manner to facilitate detection and timing/frequency acquisition, a "MIMO" pilot may be sent in a manner to facilitate channel estimation for a MIMO channel, and so on.

Wireless device 100a may utilize one receiver unit to detect for the beacon pilot and may utilize all N receiver units to process the MIMO pilot.

The multi-antenna wireless device and the power saving techniques described herein may be implemented by various means. For example, the circuit blocks in the digital section of the wireless device may be implemented with one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The circuit blocks in the analog section of the wireless device may be implemented with one or more RF integrated circuits (RFICs), discrete components, and so on.

The power saving techniques may be implemented with hardware, software, or a combination thereof. The selective enabling and disabling of the various circuit blocks within the wireless device may be performed by a hardware unit (e.g., a micro-controller, a state machine, and so on). The selective enabling and disabling of the circuit blocks may also be performed by software codes executed on a processor. The software codes may be stored in a memory unit (e.g., memory unit 242 in FIG. 2) and executed by a processor (e.g., power controller 230). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A multi-antenna wireless device comprising:
 a plurality of (N) receiver units operatively coupled to a plurality of antennas, one receiver unit for each set of at least one antenna from among the plurality of antennas, each receiver unit operable to process a respective input signal and provide an output signal, wherein N is a positive integer number; and
 a controller that selectively enables or disables respectively each of the N receiver units based at least in part on a current operating state and a current mode of operation of the wireless device, the current operating state is one of a subset of available operating states comprising an idle state, a sleep state, and a communication state, wherein the wireless device operates in the idle state, the sleep state, and the communication state at respective times, the current mode of operation is one of a subset of available modes of operation comprising single-input (SI) mode for reception of one input signal via one antenna of the plurality of antennas multiple-input (MI) mode for reception of multiple signals via multiple antennas of the plurality of antennas and a standby mode wherein all of the N receiver units are disabled, the wireless device operates in the SI mode, the MI mode and the standby mode at respective times, and wherein the available operating states and available modes of operation are respectively associated with respective different combinations of enabled receiver units of the plurality of (N) receiver units, wherein each of the respective different combinations of the enabled receiver units ranges from zero receiver units enabled up to N receiver units enabled.

2. The wireless device of claim 1, wherein the controller enables one of the N receiver units and disables remaining ones of the N receiver units when the current operating state and the current mode of operation supports reception of a single input signal is selected, and wherein the enabled receiver unit processes the single input signal.

3. The wireless device of claim 1, wherein the controller enables multiple ones of the N receiver units and disables remaining ones, if any, of the N receiver units when the current operating state and the current mode of operation supports reception of multiple input signals is selected, and wherein the enabled receiver units process the multiple input signals.

4. The wireless device of claim 1, wherein the controller disables the N receiver units when data is not received.

5. The wireless device of claim 1, further comprising:
a power source operative to deliver power to each receiver unit that is enabled by the controller.

6. The wireless device of claim 1, further comprising:
a clock generator to generate clocks for processing units that are enabled and to disable clocks to processing units that are disabled.

7. The wireless device of claim 1, further comprising:
a clock generator to generate at least one clock for the at least one of the N receiving units, the at least one clock having a variable frequency determined by data rates used for data reception to operate at least one of the N receiver units at a frequency lower than a maximum frequency that is determined based at least in part on a data rate for data reception by the at least one of the N receiver units to reduce power consumption.

8. The multi-antenna wireless device of claim 1, further comprising:
a plurality of (N) transmitter units operatively coupled to a plurality of antennas, one transmitter unit for each set of at least one antenna from among the plurality of antennas, each transmitter unit operable to process a respective input signal and provide an output signal, wherein N is a positive integer number; and
wherein the controller selectively enables or disables respectively each of the N transmitter units based at least in part on a current operating state of the wireless device, the current operating state is one of a subset of available operating states comprising an idle state, a sleep state, and a communication state, wherein the wireless device operates in the idle state, the sleep state, and the communication state at respective times, and each of the available operating states respectively associated with respective different combinations of the N transmitter units enabled, wherein each of the respective different combinations of the N transmitter units enabled ranges from zero transmitter units enabled up to N transmitter units enabled.

9. The wireless device of claim 8, wherein the controller enables one of the N transmitter units and disables remaining ones of the N transmitter units when the current operating state supports transmission of a single output signal, and wherein the enabled transmitter unit generates the single output signal.

10. The wireless device of claim 8, further comprising:
a power source operative to cut off power to each transmitter unit that is disabled by the controller.

* * * * *